United States Patent [19]

Ushio et al.

[11] Patent Number: 5,156,687

[45] Date of Patent: Oct. 20, 1992

[54] METHOD FOR PAINTING PRETREATMENT OF PLASTIC FORMINGS AND CLEANER FOR PAINTING PRETREATMENT

[75] Inventors: Akira Ushio; Tamotsu Sobata, both of Osaka; Kazuo Nobe, Kyoto, all of Japan

[73] Assignee: Nippon Paint Co., Ltd., Osaka, Japan

[21] Appl. No.: 571,909

[22] Filed: Aug. 24, 1990

[30] Foreign Application Priority Data

Aug. 28, 1989 [JP] Japan ................. 1-222163
Aug. 28, 1989 [JP] Japan ................. 1-222164

[51] Int. Cl.$^5$ ............................................. B08B 3/00
[52] U.S. Cl. ................................. 134/40; 134/1; 134/38; 134/42
[58] Field of Search ................ 134/40, 1, 38, 42

[56] References Cited

U.S. PATENT DOCUMENTS

| | | | |
|---|---|---|---|
| 3,536,529 | 10/1970 | Fiocco | 134/40 |
| 3,807,054 | 4/1974 | Joseph et al. | 34/73 |
| 4,207,193 | 6/1980 | Ford et al. | 134/40 |
| 4,336,152 | 6/1982 | Like et al. | 252/106 |
| 4,528,245 | 7/1985 | Jobbins | 428/457 |
| 4,576,738 | 3/1986 | Colodney et al. | 252/559 |
| 4,597,887 | 7/1986 | Colodney et al. | 134/40 |
| 4,734,215 | 3/1988 | Prigge | 134/40 |
| 4,851,140 | 7/1989 | Nuesslein et al. | 252/8.8 |
| 5,006,279 | 4/1991 | Grobbel et al. | 134/38 |

FOREIGN PATENT DOCUMENTS

| | | |
|---|---|---|
| 1082535 | 7/1980 | Canada . |
| 269178 | 6/1988 | European Pat. Off. . |
| 280976 | 9/1988 | European Pat. Off. . |

Primary Examiner—Asok Pal
Attorney, Agent, or Firm—Lowe, Price, LeBlanc & Becker

[57] ABSTRACT

It is required to undergo painting pretreatment of a plastic formings by a method which is replaceable of a vapor-washing method using a chlorinated hydrocarbon in order to prevent from the environmental destruction by the chlorinated hydrocarbon.

A plastic formings is brought in contact and treated with a treating solution prepared by suspending a hydrocarbons solvent in water.

A plastic formings is brought in contact and treated with a treating solution containing an alkali component and then, said treating solution attaching on the surface of said formings is rinsed out and, in at least a final stage of the rinsing-out, the surface of said formings is brought in contact with a surface-conditioning solution which contains a nonionic surface-active agent having the HLB value of 10 to 17 in a concentration range of 0.001 to 100 g/l.

10 Claims, No Drawings

METHOD FOR PAINTING PRETREATMENT OF PLASTIC FORMINGS AND CLEANER FOR PAINTING PRETREATMENT

BACKGROUND OF THE INVENTION

The present invention relates to a method for painting pretreatment of a plastic formings and a cleaner for painting pretreatment.

Since a plastic bumper for an automobile makes some contribution in production of a light weight of automobiles and is superior in moldability, the plastic bumper is a main current in the automobile bumpers. In particular, since a bumper made of a polyolefin resin bumper has an advantage in the moldability and economical cost, it has been widely adopted. However, since the polyolefin resin formings is chemically inactive, the adhesion of a paint film is not satisfactory.

Thus, there have been made various kinds of proposals from the sides of material, coating, and painting pretreatment, and some of the proposals are practically used.

In the side of material, there have been reported a material in which a resin of good adhesive strength is blended with a polypropylene resin (refer to Japanese Official Patent Provisional Publication, showa 48-43441) and a material in which a polystyrene resin and an elastomer are used in combination (refer to Japanese Official Patent Provisional Publication, showa 52-141854) and so on.

In the side of coating, there has been proposed a primer composition for painting, which contains a dissolved chlorinated polyolefin, a material made of a polypropylene resin (refer to Japanese Official Patent Provisional Publications, showa 58-8734 and showa 58-15535).

In the side of painting pretreatment, there has been proposed a method in which an inactive polyolefin resin formings is treated with plasma and a functional group is introduced into a surface of the formings in order to elevate the adhesion of a painting film (refer to Japanese Official Patent Gazette, showa 60-46133).

However, in the formings which is obtained from a variously-improved polyolefin resin by an injection molding or an extrusion molding etc., a mold release agent is tightly attached on the formings surface or also, so-called WBL (Week Boundary Layer) is often formed by that a non-crystalline polyolefin resin or a resin having low molecular weight undergo a surface-concentrating. Such dirt as a mold release agent and WBL etc. disturbs the adhesion of a painting film. Therefore, unless the dirt is taken out, an adhesion-elevating effect on a painting film resulting from said plasma treatment and primer composition can not sufficiently be expected.

Hitherto, such dirt as the WBL is removed by a vapor-washing method using a chlorinated hydrocarbon such as 1,1,1-trichloroethane (hereinafter, referred to as "TCE"). The vapor-washing method by TCE is superior in a washing effect and mass production, and is widely adopted.

However, since the chlorinated hydrocarbons, for example TCE, has a problem of air-pollutio, water-pollution, and, especially, destruction of the ozone layer of earth, they are all discontiued in a whole world in a year of 2005 and are no longer used (a Montreal protocol of the second meeting of the Contracting States, Jun. 26th, 1990).

Therefore, it is required to undergo painting pretreatment of a plastic formings by a method which does not cause said environmental destruction. As a method of this kind have been considered, instead of the chlorinated hydrocarbon, to adopt a solvent in a hydrocarbon series which have a washing effect in an extent similar to that of the chlorinated hydrocarbon. However, there is such a problem as the solvent in a hydrocarbon series easily ignites and requires carefulness in handling when it is used for the vapor-washing method.

Therefore, the subject of the present invention is to provide a method for painting pretreatment of a plastic formings which is replacable of a hitherto-known vapor-washing method wherein the chlorinated hydrocarbon being used, is effective on the painting pretreatment of a plastic formings, and does not cause the environmental destruction, and in addition, to provide a rinsing agent for degreasing which is used for the forementioned method.

SUMMARY OF THE INVENTION

To solve said subject, the present invention provides a method for painting pretreatment of a plastic formings wherein a plastic formings is brought in contact and treated with a treating solution prepared by suspending a hydrocarbons solvent in water [hereinafter, this "treating solution" is referred to as "treating solution (i)"].

The present invention, also, provides a method for painting pretreatment of a plastic formings wherein a plastic formings is treated with immersing the plastic formings in the treating solution (i) and apllying an ultrasonic wave.

According to the present invention, after treating the formings, said treating solution (i) that attaches on the surface of said formings may be rinsed out and, in at least a final stage of the rinsing, the surface of said formings may be brought in contact with a surface-conditioning solution that contains a nonionic surface-active agent having the HLB value of 10 to 17 in a concentration of 0.001 to 100 g/l.

Furthermore, the present invention provides a method for painting pretreatment of a plastic formings wherein after a plastic formings is brought in contact and treated with a treating solution containing an alkali component, said treating solution that attaches on the surface of said formings is rinsed out and, in at least a final stage of the rinsing, the surface of said formings is brought in contact with a surface-conditioning solution that contains a nonionic surface-active agent having the HLB value of 10 to 17 in a concentration of 0.001 to 100 g/l.

According to the present invention, the latter treating solution containing an alkali component may be the one which contains an alkali builder, a hydrocarbons solvent, and a surface-active agent as essential components [hereinafter, this "treating solution" is referred to as "treating solution (ii)"].

According to the present invention, said surface-conditioning solution may have a resistivity of 10,000 $\Omega$.cm or more.

Also, the present invention provides a cleaner for painting pretreatment composed of;
a combination of a hydrocarbons solvent; and
at least one agent selected from a group consisting of a solubilizer, which is used for dissolving said solvent into water, and a suspending agent which is used for suspending said solvent into water [hereinafter, this cleaner is referred to as "cleaner (I)"]. This cleaner (I) is used for preparing a treating solution (i).

Furthermore, the present invention provides a cleaner for painting pretreatment which contains ① the undermentioned alkali builder in a concentration of 2 to 200 g/l, ② the undermentioned solvent in a concentration of 0.3 to 30 g/l, and ③ the undermentioned surface-active agent in a concentration of 0.1 to 10 g/l, and which is adjusted to have a pH value of at least 8 [hereinafter, this cleaner is referred to as "cleaner (II)"]. This cleaner (II) is used as a treating solution (ii).

① One or more kinds of alkali builders selected from a group consisting of silicates, phosphates, carbonates, and alkali hydroxides.

② One or more kinds of hydrocarbons solvents.

③ A nonionic surface-active agent having the HLB value of 10 to 17.

Although a method for painting pretreatment and a cleaner for pretreatment in the present invention are most effective in a case of that a polyolefin-based resin formings and/or an urethane-based resin formings are objects as a plastic formings, not only the polyolefin-based and the urethane-based resin formings but also various kinds of resin formings such as a polyamide-based, a polyester-based, a polybutadieneterephthalic acid-based, and an acrylonitrile-butadiene-styrene-based resin formings etc. can be applied as a plastic formings with having a similar purpose. As said plastic formings is cited, for example, an automobile bumper made of a plastics, but it is not limited within these examples.

The object for which the method for painting pretreatment of the present invention is applied is a plastic formings, but it is not limited within a formings which is made by only the plastic and it may be an assembly in which a plastic is combined into one body with a metal such as a steel plate.

In the present invention, as a hydrocarbons solvent is used one compound by alone selected from a group consisting of the aliphatic, alicyclic, aromatic, and terpene hydrocarbons and petroleum naphtha, or are used two or more compounds in combination. These hydrocarbons may be either a saturated one or an unsaturated one. As a saturated aliphatic hydrocarbon (paraffin) is preferred the one having $C_6$ or more carbons and more preferred the one having $C_{10}$ or more carbons. If it is a paraffin having carbons less than $C_6$, because of the low boiling point it may be a gas or may easily evaporate, so that the smell may be a problem, and because of the low flash point it may create a safety problem. As a saturated alicyclic hydrocarbon (cycloparaffin) are cited cyclohexane, methylcyclohexane, cyclodecane, and decalin etc. As an aromatic hydrocarbon is used anyone of $C_6$ to $C_{18}$ and is preferred the one having a high boiling point and/or a high flash point. As an aromatic hydrocarbon are cited, for example, xylene, dodecylbenzene, and tetralin etc. As a terpene hydrocarbon are cited, for example, d-limonene, dl-limonene, and pinene etc. A mixture solvent composed of a plural hydrocarbon and having a flash point of 40° C. or higher, for example, kerosene, petroleum spirit, and petroleum naphtha can be used as a hydrocarbons solvent in the present invention. There are known, as said petroleum naphtha, for example, "SOLVESSO 100" and "SOLVESSO 150" made by Esso Standard Co., "Nisseki Hisol 100, 150, SAS" and "Naphtesol L, M, H" etc. made by Nippon Petrochemicals Co., Ltd.

In the present invention, as a hydrocarbons solvent, the use of two or more kinds of compounds selected from a group consisting of a paraffin, a cycloparaffin, an aromatic, and terpene hydrocarbons and petroleum naphtha is preferred. This is due to a fact that use of a plural kinds more elevates the solubility of WBL than the single use.

Among these hydrocarbons solvents, an use of at least one selected from cycloparaffin and petroleum naphtha is more preferred. The reason for this is that the cycloparaffin and petroleum naphtha are superior in a removing effect on WBL in a resin and in an effect on removal of a mold release agent. As a cycloparaffin are practically cited, for example, decalin.

The amount of addition of a hydrocarbons solvent is not especially limited, but when a solution for painting pretreatment is prepared, preparation of, for example, 0.1 to 40% by weight (hereinafter, the "% by weight" is simply referred to as "%") is preferred and preparation of 0.5 to 20% is more preferred. If it is less than 0.1%, the dirt-taking out effect may be absent and, if exceeds 40%, the dirt-taking out effect no more increases and an economical advantage takes place with an increasing solvent-amount being carried away with attaching to a washing substrate after the pretreatment. Also, an amount of 40% or less is desired form a standpoint of prevention of disasters.

As a method, in which said hydrocarbons solvent is suspended in water and this suspended state is maintained, are cited, for example, mechanical stirring and addition of at least one agent in a solubilizer and a suspending agent.

The mechanical stirring used in the present invention may be anyone which causes a turbulent flow and, for example, besides agitation by a usual propeller or turbine-fan, a jet stream mixing is cited, but the stirring is not limited within these examples.

A purpose of the suspending agent used in the present invention is that said hydrocarbons solvent into water is kept at a constant in the emulsification and suspended without any quality-change. Furthermore, it is necessary that the plastic does not undergo the quality-change and deterioration. A suspending agent which satisfies these conditions prefers an use of one or more kinds of substances selected from a group consisting of, for example, a neutral and/or weakly acidic salt soluble in water. As the weakly acidic salt are cited sodium primary phosphate, sodium hydrogen pyrophosphate, sodium hydrogen metaphosphate, acid sodium fluoride, acid potassium fluoride, and acid ammonium fluoride etc. As the neutral salt are cited sodium chloride, sodium sulfate, sodium nitrate, potassium chloride, potassium sulfate, potassium nitrate, ammonium sulfate etc. The amount of addition is against the total amount of a treating solution, for example, a concentration of 0.01 to 10% and, preferably, a concentration of 0.1 to 5%. Moreover, to get a weakly acidic condition, an acid such as phosphoric acid etc. may be added.

The solubilizer used in the present invention may be a solvent or nonionic surface-active agent which is able to dissolve or to emulsify said hydrocarbons solvent together with water. For example, a hydrocarbons solvent is dissolved or emulsified in water by using a solubilizer so that an effect of the hydrocarbons solvent is continued with making it nonflammable.

As a solubilizer in the present invention are preferred for use one or more kinds selected from a group of compounds, which consists of such compounds as a nonionic surface-active agent, an alcohol of $C_1$ to $C_4$, a monoethyleneglycol derivative, a diethyleneglycol derivative, and a propyleneglycol derivative, are dissolved into water, for example, at room temperature, and also, dissolve said hydrocarbons solvent. By dissolving the hydrocarbons solvent into water by using a solubilizer of this kind, the effect of a hydrocarbons solvent is continued with making it nonflammable.

As a nonionic surface-active agent may be used, for example, such a type of polyoxyethylenes as an alkyl allyl ether, an alkyl ether, and an alkyl ester, and a sorbitan derivative etc. and also, other agents of common use. As an alcohol of $C_1$ to $C_4$ may be anyone which optionally dissolves into water, for example, a monohydric alcohol such as ethyl alcohol and butyl alcohol etc. and a polyhydric alcohol such as ethyleneglycol, diethyleneglycol, and propyleneglycol etc. As a monoethyleneglycol derivative are cited, for example, such an ethyleneglycol ether as ethylcellosolve and butylcellosolve. As a diethyleneglycol derivative is cited, for example, butylcarbitol (diethyleneglycol butyl ether) etc. As a propyleneglycol derivative is cited, for example, polypropyleneglycol.

The amount of addition of a solubilizer may be set in an extent of that a hydrocarbons solvent and the solubilizer dissolve into water, depending upon an added amount of the hydrocarbons solvent and the solubilities into water of the hydrocarbons solvent and solubilizer, and the amount of addition is not especially limited. Also, the hydrocarbons solvent may be separated from water. The amount of addition of the solubilizer prefers to be approximately in a range of 0.01 to 10% when a solution for painting pretreatment is prepared, and further prefers to be 0.1 to 3.0%. If it is less than 0.01%, the effect may be none and, if exceeds 10%, it turns out that a solubilizer is wasted.

The cleaner (I) relating to the present invention, in cases of necessity, may be added with other additives besides said hydrocarbons solvent, suspending agent, and solubilizer. However, the treating solution (i) which is used in the method for painting pretreatment for relating to the present invention displays a sufficient washing effect without containing an alkali component such an alkali builder (for example, in a range of neutral to weak acid), so that said cleaner (I) needs not to contain the alkali component.

Said treating solution (i) which is used in the method for painting pretreatment relating to the present invention is prepared, for example, by suspending said hydrocarbons solvent into water by means of, for example, adding to water said cleaner (I). Independent of said cleaner (I) said other additives may be added.

The dirt on a surface of said plastic formings is taken out by that the plastic formings is brought in contact with a treating solution (i) obtained. This contact may be carried out by, for example, immersing, spraying, or these combination. By doing this, the dirt such as a mold release agent on the surface of said formings and said WBL are dissolved by said treating solution (i) and taken out from the surface of formings. Temperature of the treating solution (i), when the washing is carried out, is not especially limited, but for example, is set in a range of 20° to 90° C. A period of washing-time prefers to be in a range of 10 seconds to 20 minutes and further prefers to be in a range of 30 seconds to 5 minutes. If the time period is less than 10 seconds, the washing effect is absent and, if is longer than 20 minutes, the effect no more increases and it is economically disadvantageous.

When said formings is brought in contact with said treating solution (i), it is preferred that, for example, said formings is immersed in said treating solution (i) and applied with stirring or with an ultrasonic wave. With doing this, said treating solution (i) displays more effectively the dirt-taking out effect with additional effects of the stirring and the ultrasonic wave vibration.

The conditions when the ultrasonic wave is applied is not especially limited, for example, are set as follows. Temperature of the treating solution (i) is desired to be in a range of 40° to 80° C. where the washing effect due to the ultrasonic wave is at maximum. The operating condition for an ultrasonic wave may be a general one for a common ultrasonic wave-washing device. The frequency prefers to be in a range of 1 to 500 kHz and more prefers to be in a range of 20 to 100 kHz, and the output power may be from 0.01 to 10 W/cm$^2$.

Since said treating solution (i) does not contain a chlorinated hydrocarbon, it does not cause water-pollution arising from the chlorinated hydrocarbon. Also, since a hydrocarbons solvent is used with suspending it into water, ignition is difficult and, therefore, handling is easy. Also, since the hydrocarbons solvent is hard to volatilize from said treating solution (i), any problem in a lavor sanitary field does not easily takes place.

A plastic formings which has been treated with the dirt-taking out as mentioned above is rinsed with water, dried, and coated. A plastic formings which has been treated with a method for painting pretreatment of the present invention displays the paint film adhesion in the same extent as a formings which has been treated with a hitherto-known TCE vapor-washing method. Moreover, if the surface of said formings is activated before coating with such treatment as plasma treatment or ultraviolet irradiation, a paint more easily attaches and the paint film adhesion further increases. Also, after said painting pretreatment is carried out, it is recommended that, in at least a final stage of the step that said treating solution (i) is rinsed out, a plastic formings is brought in contact with a surface-conditioning solution which contains a nonionic surface-active agent having the HLB value of 10 to 17 in a concentration of 0.001 to 100 g/l, in order to wet the surface uniformly or almost uniformly. This is because the surface of a plastic formings primarily well repels water and, after rinsing with water is carried out, it does not uniformly wet and forms water-drops. Thus, a component being contained in the water-drops does not uniformly spread on the surface of a formings, but it is unevenly distributed, so that, upon formation of a paint film, properties such as an adhesive character differ depending upon a local place on the formings surface. To prevent these, treatment like the above is recommended.

Another treating solution which is used in the method for painting pretreatment of a plastic formings in the present invention contains an alkali component. As this alkali component is cited, for example, the undermentioned alkali builder. Besides the alkali component, a surface-active agent etc. may be combined in cases of necessity. From a standpoint of that an effect of painting pretreatment is superior, an use of a treating solution (ii) which contains an alkali builder, a hydrocarbons solvents, and a surface-active agent as essential components is preferred. A treating solution (ii) of this kind is, for example, said cleaner (II) prepared by adding the following components to water followed by mixing.

The alkali builder has a role to elevate the paint film adhesion with removing WBL.

As said alkali builder are used one or more compounds selected from, for example, a group consisting of the silicates, phosphates, carbonates, and alkali hydroxides, but are not limited within the group of compounds. Said silicates, phosphates, carbonates, and alkali hydroxides are the alkali metal salts and ammonium salts. As said silicates are cited, for example, the orthosilicates, polysilicates, mesosilicates, and metasilicates. As said phosphates are cited, for example, the orthophosphates, hydrogen orthophosphates, condensed phosphates (polyphosphates), and metaphosphates. As said carbonates are also involved the hydrogen carbonates that are acidic salts. The alkali hydroxides usually are the hydroxides of alkali metals, but in the present invention is also involved ammonium hydroxide.

If as an alkali builder are used one or more compounds selected from a group consisting of the silicates, phosphates, carbonates, and alkali hydroxides, there is such an advantage as the WBL-removing effect increases and the adhesion of a paint film further elevates. It is preferred that the silicates is 50% or more in the whole amount of alkali builders. If the silicates are 50% or more, the WBL-removing effect is the strongest and the adhesion of a paint film is the most effective. If an example of favorable combination is cited, it is from 50 to 80% of the silicate, from 10 to 50% of the carbonate, and from 10 to 50% of the phosphate against a whole amount of alkali builders. Particularly, in a case of that a polyolefin-based resin formings undergoes painting pretreatment, the use of a metasilicate as an alkali builder is most favorable.

The concentration of an alkali builder in said treating solution (ii) prefers to be, for example, in a range of 2 to 200 g/l and further prefers to be in a range of 5 to 100 g/l. If it is less than 2 g/l, the adhesion of a paint film may be insufficient. If exceeds 200 g/l, the effect does no more elevate and an ecomonical disadvantage takes place.

In said treating solution (ii) and cleaner (II), one compound selected from a group consisting of the above-mentioned hydrocarbons solvents may be used by alone or two or more compounds may be used in combination.

As the hydrocarbons solvent in the treating solution (ii) and cleaner (II) are preferred for use one or more compounds selected from a group consisting of kerosine, petroleum naphtha, benzene, xylene, and toluene. This is because these compounds have an advantage in a WBL-removing ability, the efficiency of handling works, and the economical cost.

The amount of addition of the hydrocarbons solvent in said treating solution (ii) is not especially limited, but it is preferred to be in a range of 0.3 to 30 g/l. If it is less than 0.3 g/l, the adhesion of a paint film may be insufficient and, if exceeds 30 g/l, there are observed no elevation of the effect and an economical disadvantage.

The surface-active agent used in said treating solution (ii) has no special limitation, but a nonionic surface-active agent is used. Among the nonionic surface-active agents is preferred the one having the HLB value of 10 to 17 and further preferred the one having the value of 11 to 16. If the value is less than 10, the removing ability for WBL becomes inferior and, as a result, the adhesion of a paint film may be insufficient or the ability for emulsification may lack. If the value exceeds 17, the removing ability for WBL becomes inferior and, as a result, the adhesion of a paint film may be insufficient or a foaming character becomes strong and the efficiency of works decreases.

As a nonionic surface-active agent of this kind is preferred at least one compound selected from a group consisting of ① a condensation product from a higher alcohol and an alkylene oxide and ② a condensation product from an alkylphenol and an alkylene oxide. As a commertially-available product for said nonionic surface-active agent are cited, for example, the following compounds.

(1) A condensation product from a higher alcohol and an alkylene oxide:
① a polyoxyethylenepolyoxypropylene compound;
"Pluronic F-68" (made by Asahi Denka Kogyo K. K., the HLB value of 15.5)
"Noigen EA 140" (made by Daiichi Kogyo Seiyaku Kabushiki Kaisha, the HLB value of 14)
② an ethoxylate of a (primary or secondary) straight chain alcohol;
"Adekatol SO 135" (made by Asahi Denka Kogyo K. K., the HLB value of 13.5)
"Adekatol LO 7" (made by Asahi Denka Kogyo K. K., the HLB value of 12)
"Softanol 90" (made by Nippon Shokubai Kagaku Kogyo Co., Ltd., the HLB value of 13.3)

(2) a condensation product from an alkylphenol and an alkylene oxide:
a nonylphenol ethoxylate;
"Emulgen P I-20T" (made by Kao Corporation, the HLB value of 13.2)
"Emulgen 910" (made by Kao Corporation, the HLB value of 12.2)
"Adekatol NP 695" (made by Asahi Denka Kogyo K. K., the HLB value of 13.0)

Besides, to depress the foaming, an addition of not only a nonionic surface-active agent having a HLB value lower than that in said range but also various kinds of commertially available surface-active agents having the anti-foaming character is not prohibited in an extent that the effect of the present invention is not disturbed.

The concentration of a surface-active agent in said cleaner (II) is not especially limited, but it is preferred to be, for example, from 0.1 to 10 g/l. If it is less than 0.1 g/l, the adhesion of a paint film becomes insufficient with passage of time and, if exceeds 10 g/l, the adhesion of a paint film may be insufficient or a trend of the foaming may increase.

Said treating solution (ii) prefers to have a pH value of 8 or more, and further prefers to have a pH value in a range of 9 to 13. If the pH value is less than 8, the adhesion of a paint film may be insufficient.

Said treating solution (ii) may be added with, in case of necessity, other kinds of additives than said alkali builder, hydrocarbons solvent, and surface-active agent. As additives of this kind are cited, for example, a titanium phosphate compound and a nitrite.

The treating solution (ii) used in a method for painting pretreatment relating to the present invention is prepared by mixing said components with water.

A plastic formings is brought in contact with a treating solution (ii) above-obtained. As a method in which said plastic formings is brought in contact with said treating solution (ii) is adopted, for example, an immersing method, an ultrasonic wave washing method, a spraying method, a wiping method by using a brush, cloth, and sponge etc. and other proper methods.

Among the methods, the ultrasonic washing method and spraying method are preferred from standpoints of an elevating effect on the adhesion of a paint film and the mass production. By the method, dirt such as a mold release agent on a surface of the formings and the forementioned WBL etc. is dissolved by a treating solution (ii) and removed from a surface of the formings. Temperature of the treating solution (ii) when applied for cleaning is not especially limited and, though the contact with the solution may be carried out at a high temperature in a range of that a thermal quality change does not take place in a plastic formings, it is usually carried out in a range of 30° to 80° C. The cleaning time period prefers to be in a range of 30 seconds to 10 minutes. If it is less than 30 seconds, the rinsing effect is lacking and, if carried out for a period longer than 10 minutes, the effect does no more elevate, but an economical disadvantage is found.

When said formings is brought in contact with said treating solution (ii), for example, dipping of said formings in said treating solution (ii) and applying an ultrasonic wave is preferred. Doing like this, the treating solution (ii) as well as an ultrasonic wave vibration further elevates the dirt-taking out effect.

The condition for applying an ultrasonic wave is not especially limited, but for example, is set as the abovementioned.

Since said treating solution (ii) does not contain any chlorinated hydrocarbon, water-pollution by the chlorinated hydrocarbon does not take place. Besides, since a hydrocarbons solvent is added to water (for example, emulsification), ignition is difficult, so that handling is easy. Also, since a hydrocarbons solvent is not easily volatilized from said treating solution (ii), there will be no problem in the labor conditions and sanitary field.

A plastic formings which, as mentioned above, underwent the dirt-taking out by the treating solution (ii) is forwarded to the step where a treating solution (ii) attaching to a surface of the formings is rinsed out. The formings surface is treated with bringing it in contact with said surface-conditioning solution at least a final stage of the step rinsing. Then, after drying the formings surface is coated.

In the rinsing step, said rinsing out of the treating solution (ii) by the surface-conditioning solution may be carried out from a beginning stage, but at first, rinsing out of the treating solution (ii) by water and, at second, treating with the surface-conditioning solution is economically favorable.

The nonionic surface-active agent which is contained in said surface-conditioning solution needs to have a HLB value of 10 up to 17 and prefers the value of 12 up to 14. If the value is less than 10, ununiform dryness takes place in a drying step, which is carried out after being brought in contact with the surface-conditioning solution, because the affinity property to water is very low, and it becomes a reason of mottle formation on a paint film. On the other hand, if the value exceeds the HLB value of 17, the foaming is too strong and, there occures such a problem in the efficiency of works as foam overflows from a tank of a surface-conditioning solution. As a nonionic-surface active agent of this kind are cited, for example, the ones which are mentioned in the part of said treating solution (ii). Among them, an ethoxylate of a secondary straight chain alcohol having the HLB value of 12 to 14 is most preferred.

If a surface-active agent besides the nonionic surface-active agent, for example, an ionic surface-active agent is used, the water-resistant adhesion of a paint film becomes insufficient. Also, the concentration of a nonionic surface-active agent in a surface-conditioning solution needs to be adjusted in a range of 0.001 to 100 g/l and prefers to be in a range of 0.01 to 10 g/l. If the concentration is less than 0.001 g/l, there is observed ununiform dryness which may become to a reason of mottle formation. If exceeds 100 g/l, the water-resistant adhesion of a paint film becomes insufficient.

Besides, the surface-conditioning solution is used to improve the affinity of a surface of a plastic formings with water, but if it contains a large amount of electrolyte, this electrolyte remains on said surface and may give a bad effect on the adhesion of a paint film. Therefore, the surface-conditioning solution prefers to have a resistivity of 10,000 $\Omega$.cm or more and more prefers to have that of 100,000 $\Omega$.cm. If the resistivity is less than 10,000 $\Omega$.cm, the water-resistant adhesion of a paint film may be insufficient.

The method in which a surface of a plastic formings is brought in contact with a surface-conditioning solution (a method for bringing a formings in contact with a surface-conditioning solution) is not especially limited and, for example, an immersing method and a spraying method etc. can be selected. Also, the temperature may be from room temperature up to 60° C. so that the quality of a formings is not thermally affected. The time period may be a time enough to subtitute attaching water and, for example, may be from about 10 seconds to 2 minutes.

The drying method which is carried out after treated with a surface-conditioning solution is not especially limited, but for example, in a range of that parts of a formings is not affected with a thermal quality change, the process from thermal drying to standing at room temperature can be carried out under a desirable condition. More concretely, the drying may be done at a temperature of 40° to 80° C. during 1 to 20 minutes.

A plastic formings for which the painting pretreatment of the present invention is carried out is in almost the same extent in the adhesion of a paint film as a plastic formings which is treated with a hitherto-known TCE vapor-washing method. Before the painting, if a surface of said formings is activated with such treatment as plasma treatment and UV light irradiation so that a paint more easily attaches, the adhesion of a paint film increases.

In at least a final stage of the step, which rinses out a treating solution (ii) that attaches on a surface of a plastic formings after the washing treatment for degreasing, the surface of said formings is brought in contact with a surface-conditioning solution which contains a nonionic surface-active agent having the HLB value of 10 to 17 in a concentration range of 0.001 to 100 g/l. The surface of a plastic formings primarily well repels water, so that it does not uniformly wet after the rinsing with water being carried out and cause formation of waterdrops. Because of this, a component being contained in said waterdrops, especially an alkali builder, does not uniformly exist on a formings surface, but unevenly distributes and, when a paint film is formed, properties such as adhesion becomes uneven depending upon a local place on the formings surface. To prevent this kind of phenomenon, the treatment by said surface-conditioning solution is carried out. Thus, the surface of a formings does not repel water and uniformly wet, and chemicals being remaining in water do not unevenly distribute on the surface of a formings, but uniformly distribute. Accordingly, the adhesion of a paint film being formed on the surface becomes uniform as a whole.

EXAMPLE

Hereinafter, practical examples and examples for comparison in the present invention is presented, but the present invention is not limited with these examples.

EXAMPLES 1 TO 8 AND EXAMPLES FOR COMPARISON 1 AND 2

Using the cleaner for painting pretreatment (I) shown in Table 1, a treating solution (i) having a composition shown in the table was prepared.

Besides, the "SOLVESSO 100" in the table is petroleum naphtha made by Esso Standard Co., "Naphtesol M" is petroleum naphtha made by Nippon Petrochemicals Co., Ltd., and "Newcol 565" is a nonionic surface-active agent made by Nippon Nyukazai Co., Ltd.

Using said treating solution (i) and according to the method for painting pretreatment shown in Table 1, painting pretreatment is carried out on a surface of a polypropylene resin formings. An ultrasonic washing device used here is the "W-118" made by Honda Denshi Kabushiki Kaisha and the ultrasonic vibration conditions are 45 kHz for the frequency and 300 W/(25 cm×35 cm) ($\approx$0.34 W/cm$^2$) for the outputting power. Stirring is carried out with 1000 rpm by using a propeller fan.

The resin formings, after the painting pretreatment was carried out, was rinsed by spraying tap water for 15 seconds and dried at 55° C. for 15 minutes. Next, this formings was coated by spraying a chlorinated polypropylene-based primer coating ("RB-123 M Primer" made by Nippon Bee Chemical Co., Ltd.) so as to make a dried film of thickness of 8 to 12 μm, stood for 10 minutes, and cured at 80° C. for 30 minutes. Next, the metallic paints ("R-255 M Base" and "R-255 No. 7 Clear", made by Nippon Bee Chemical Co., Ltd.) were successively coated by spraying so as to make respectively a dried film of thickness of 45 to 50 μm and cured at 90° C. for 40 minutes to get a coated test plate.

Inflammability of the treating solutions (i) used said examples and examples for comparison are shown in Table 2.

Paint film tests were carried out as follows for the coated test plates obtained from said examples and examples for comparison and the results obtained are shown in Table 2.

PAINT FILM TESTS

① Strength of Paint Film for Peeling-Off

With a tensile-testing machine (made by Toyo Boldwine Co.) a paint film of a coated test plate was peeled with a width of 1 cm and a velocity of 50 mm/min and its strength was shown.

② Immersing Test in Warm Water of 40° C.

A coated test plate was immersed in warm water of 40° C. for 240 hours and then, whether a blister was present or absent was examined and whether a paint film which was cut like checkers was peeled with an adhesive tape (indicated with a cross) or not (indicated with a circle) was examined.

③ Immersing Test in Gasoline

A coated test plate was immersed in gasoline for 2 hours and then, whether a paint film was peeled (indicated with a cross) or not (indicated with a circle) was examined by a naked eye.

④ Humidity Test

A coated test plate was exposed in an atmosphere of 100% RH at 50° C. for 240 hours and then, whether a blister occured or other kinds of abnormality took place (indicated with a cross) or not (indicated with a circle) was shown. An obscure (inbetween) was indicated with a triangle.

Among these examinations, if the strength of a paint film for peeling-off is 0.8 kg/cm or more and, in a favorable case, 1.0 kg/cm or more and the immersing test in warm water at 40° C. shows no abnormality, it is judged that the coating product has no problem in practice. Moreover, if the immersing test in gasoline and/or the humidity test show no abnormality, it is shown that the coating product has superior quality.

Besides, the inflammability was examined according to a Tagu ignition-testing method in a closed system (JIS K2265-1980) while stirring with 1000 rpm by a propeller fan.

TABLE 1

| | | | | Example 1 | Example 2 | Example 3 | Example 4 | Example 5 |
|---|---|---|---|---|---|---|---|---|
| Composition of treating solution (i) (% by weight) | Cleaner (I) | Hydrocarbons solvent | SOLVESSO 100 | 0.2 | 0.2 | 0.2 | 0.2 | — |
| | | | Xylene | 0.2 | 0.2 | 0.2 | 0.2 | — |
| | | | Decalin | 0.2 | 0.2 | 0.2 | 0.2 | 0.8 |
| | | | Tetralin | 0.2 | 0.2 | 0.2 | 0.2 | 0.2 |
| | | | Naphtesol M | 0.2 | 0.2 | 0.2 | 0.2 | — |
| | | Solubilizer | Newcol 565 | 0.2 | — | — | — | — |
| | | | Ethyl alcohol | — | 1.0 | — | — | — |
| | | | Butyl cellosolve | — | — | 1.0 | — | 1.0 |
| | | | Butyl carbitol | — | — | — | 1.0 | — |
| | Water | | | 98.8 | 98.0 | 98.0 | 98.0 | 98.0 |
| | Total | | | 100.0 | 100.0 | 100.0 | 100.0 | 100.0 |
| Method of painting pretreatment | Contact method | | | Immersing | Immersing | Immersing | Immersing | Immersing |
| | Temperature (°C.) | | | 50 | 50 | 50 | 50 | 50 |
| | Treating time (minute) | | | 2 | 2 | 2 | 2 | 0.5 |
| | Washing with ultrasonic wave | | | Done | Done | Done | Done | Done |

| | | | | Example 6 | Example 7 | Example 8 | Example for comparison 1 | Example for comparison 2 |
|---|---|---|---|---|---|---|---|---|
| Composition of treating solution (i) (% by weight) | Cleaner (I) | Hydrocarbons solvent | SOLVESSO 100 | — | — | — | — | — |
| | | | Xylene | — | — | — | — | — |
| | | | Decalin | 0.5 | 0.5 | 1.0 | — | — |
| | | | Tetralin | — | — | — | — | — |

TABLE 1-continued

|  |  |  |  |  |  |  |  |
|---|---|---|---|---|---|---|---|
|  | Solubilizer | Naphtesol M | 0.5 | 0.5 | — | 0.05 | — |
|  |  | Newcol 565 | — | — | — | 0.2 | — |
|  |  | Ethyl alcohol | 1.0 | — | — | — | — |
|  |  | Butyl cellosolve | — | 1.0 | — | — | 1.0 |
|  |  | Butyl carbitol | — | — | — | — | — |
|  | Water |  | 98.0 | 98.0 | 99.0 | 99.75 | 99.0 |
|  | Total |  | 100.0 | 100.0 | 100.0 | 100.0 | 100.0 |
| Method of painting pretreatment | Contact method |  | Immersing | Immersing | Immersing | Spraying | Immersing |
|  | Temperature (°C.) |  | 50 | 50 | 50 | 50 | 60 |
|  | Treating time (minute) |  | 2 | 2 | 2 | 2 | 2 |
|  | Washing with ultrasonic wave |  | Done | Not | Not | Done | Done |

TABLE 2

|  |  | Example 1 | Example 2 | Example 3 | Example 4 | Example 5 | Example 6 | Example 7 | Example 8 | Example for comparison 1 | Example for comparison 2 |
|---|---|---|---|---|---|---|---|---|---|---|---|
| Testing result of paint film | Strength of paint film for peeling-off (kg/cm) | >1.0 | >1.0 | >1.0 | >1.0 | >1.0 | >1.0 | >1.0 | >1.0 | <0.3 | <0.3 |
|  | Immersing test in warm water at 40° C. | ○ | ○ | ○ | ○ | ○ | ○ | ○ | ○ | X | X |
|  | Immersing test in gasoline | ○ | ○ | ○ | ○ | ○ | ○ | ○ | ○ | X | X |
|  | Humidity test | ○ | ○ | ○ | ○ | ○ | ○ | △ | △ | X | X |
| Inflammability of treating solution |  | None | None | None | None | None | None | None | None | None | None |

From Table 2, the solutions for painting pretreatment used in the examples do not have inflammability. Besides, from the results in the strength test of a paint film for peeling-off and the immersing test in warm water at 40° C., it is seen that the coated test plates obtained from the examples are at a practically usable standard. Also, if an ultrasonic wave is applied for the painting pretreatment, the results from the humidity tests become superior with high elevation of the washing effect.

EXAMPLES 9 TO 16 AND EXAMPLES FOR COMPARISON 3 AND 4

Using the cleaner (I) shown in Table 3, the treating solutions (i) shown in the same table were prepared.

Besides, "SOLVESSO 150" in Table 3 is petroleum naphtha made by Esso-Standard Co., "Naphtesol M" is a cycloaliphatic solvent made by Nippon Petrochemicals Co., Ltd., decalin is a cycloaliphatic solvent made by Huls Co., d-limonene is a terpene-based solvent made by Nippon Terpene Chemical Co., Ltd., "Newcol 565" is a nonionic surface-active agent made by Nippon Nyukazai Co., Ltd.

Using said treating solutions (i) and according to the methods for painting pretreatment shown in Table 3, painting pretreatment for the surface of a polypropylene-based resin formings was carried out. The mechanical stirring was carried out with 600 rpm by using "Three one motor" (by Sinto Kagaku Co., Ltd.).

After the painting pretreatment, the surface was rinsed with spraying of tap water for 20 seconds, sprayed with a 0.2% aqueous solution of "Emulgen 910" (a nonionic surface-active agent having the HLB value of 12.2) made by Kao Corporation, and dried at 65° C. for 15 minutes.

Next, for this formings a chlorinated polypropylene-based primer paint ("RB-123 M Primer" made by Nippon Bee Chemical Co., Ltd.) was coated with spraying so as to make a dried film of thickness of 8 to 12 μm, stood for 10 minutes, and cured at 80° C. for 30 minutes. Then, metallic paints ("R-255 M Base" and "R-266 Clear" made by Nippon Bee Chemical Co., Ltd.) were coated with spraying in series so as to make a dried film of thickness of 45 to 50 μm and cured at 90° C. for 40 minutes, whereby a coated testing plate was obtained.

The inflammability of the treating solutions (i) used in said examples and examples for comparison were examined as mentioned above and the results are shown in Table 4.

Said paint film tests were carried out for the coated test plates obtained from said examples and examples for comparison (however, mechanical stirring was, in a case of "done" in Table 3, carried out by "Three one motor" with 600 rpm, and in a case of "not" in Table 3, not carried out) and the results obtained are shown in Table 4.

TABLE 3

|  |  |  |  | Example 9 | Example 10 | Example 11 | Example 12 | Example 13 |
|---|---|---|---|---|---|---|---|---|
| Composition of treating solution (i) (% by weight) | Cleaner (I) | Hydrocarbons solvent | Decalin | 5 | 5 | — | 5 | 5 |
|  |  |  | SOLVESSO 150 | 5 | — | 5 | — | 5 |
|  |  |  | Naphtesol M | — | 5 | 5 | — | — |
|  |  |  | d-limonene | — | — | — | 5 | — |
|  |  | Suspending agent | Sodium hydrogen phosphate | — | 0.5 | — | 0.5 | — |
|  |  |  | Potassium hydrogen fluoride | — | — | 0.5 | 0.5 | — |
|  |  |  | Ammonium sulfate | — | 0.5 | 0.5 | — | — |

TABLE 3-continued

|  |  |  |  |  |  |  |  |  |
|---|---|---|---|---|---|---|---|---|
|  | Solubilizer | Newcol 565 | — | — | — | — | 0.5 |
|  |  | Ethyl alcohol | — | — | — | — | — |
|  |  | Butyl cellosolve | — | — | — | — | — |
|  | Water |  | 90 | 89 | 89 | 89 | 89.5 |
|  | Total |  | 100 | 100 | 100 | 100 | 100 |
| Method of paint- | Mechanical stirring |  | Done | Not | Not | Not | Not |
| ing pretreatment | Contact method |  | Spraying | Spraying | Spraying | Spraying | Spraying |
|  | Temperature (°C.) |  | 65 | 65 | 65 | 65 | 65 |
|  | Treating time (minute) |  | 2 | 2 | 2 | 2 | 2 |

|  |  |  |  | Example 14 | Example 15 | Example 16 | Example for comparison 3 | Example for comparison 4 |
|---|---|---|---|---|---|---|---|---|
| Composition of | Cleaner (I) | Hydrocarbons | Decalin | 5 | — | 5 | 5 | 5 |
| treating solution (i) |  | solvent | SOLVESSO 150 | — | 5 | 5 | 5 | 5 |
| (% by weight) |  |  | Naphtesol M | 5 | 5 | 5 | 5 | — |
|  |  |  | d-limonene | — | — | — | — | — |
|  |  | Suspending | Sodium hydrogen | — | — | — | — | — |
|  |  | agent | phosphate |  |  |  |  |  |
|  |  |  | Potassium hydrogen fluoride | — | — | — | — | — |
|  |  |  | Ammonium sulfate | — | — | — | — | — |
|  |  | Solubilizer | Newcol 565 | — | — | — | — | — |
|  |  |  | Ethyl alcohol | 10 | — | — | — | — |
|  |  |  | Butyl cellosolve | — | 10 | — | — | — |
|  | Water |  |  | 80 | 80 | 85 | 85 | 90 |
|  | Total |  |  | 100 | 100 | 100 | 100 | 100 |
| Method of paint- | Mechanical stirring |  |  | Not | Not | Done | Not | Not |
| ing pretreatment | Contact method |  |  | Spraying | Spraying | Immersing | Immersing | Spraying |
|  | Temperature (°C.) |  |  | 65 | 65 | 65 | 65 | 65 |
|  | Treating time (minute) |  |  | 2 | 2 | 2 | 2 | 2 |

TABLE 4

|  |  | Example 9 | Example 10 | Example 11 | Example 12 | Example 13 | Example 14 | Example 15 | Example 16 | Example for comparison 3 | Example for comparison 4 |
|---|---|---|---|---|---|---|---|---|---|---|---|
| Testing result of paint film | Strength of paint film for peeling-off (kg/cm) | >1.0 | >1.0 | >1.0 | >1.0 | >1.0 | >1.0 | >1.0 | >1.0 | 0.5 | 0.5 |
|  | Immersing test in warm water at 40° C. | ○ | ○ | ○ | ○ | ○ | ○ | ○ | ○ | ○ | X |
|  | Immersing test in gasoline | ○ | ○ | ○ | ○ | ○ | ○ | ○ | ○ | X | X |
|  | Humidity test | ○ | ○ | ○ | ○ | ○ | ○ | ○ | ○ | Δ | X |
| Inflammability of treating solution |  | NO | NO | NO | NO | NO | NO | NO | NO | YES (57° C.) | NO |

EXAMPLES 17 TO 25 AND EXAMPLES FOR COMPARISON 5 TO 7

Treating solutions (ii) (solvent: water) and surface-conditioning solutions (solvent: water) having the compositions shown in Table 5 were prepared. However, the example 23 is a case of that an organic solvent other than a hydrocarbons solvent is used for a cleaner, the example 24 is a case of that an alkali builder is not used for a cleaner, the example 25 is a case of that a hydrocarbons solvent and another kind of an organic solvent are not used for a cleaner, the example for comparison 5 is a case of that a surface-active agent of a surface-conditioning solution has a HLB value less than 10, the example for comparison 6 is a case of that an ionic surface-active agent is used in the rinsing after treating with the treating solution (ii), and the example for comparison 7 is a case of that the rinsing step by the specified surface-active agent is absent.

Besides, in Table 5 "SOLVESSO 150" is petroleum naphtha made by Esso Standard Co., "Emulgen 910" is nonylphenol ethoxylate made by Kao Corporation (HLB value of 12.2), "Newcol 565 FH" is nonylphenol ethoxylate made by Nippon Nyukazai Co., Ltd. (HLB value of 12.5), "Adekatol SO-135" is an ethoxylate of a straight chain alcohol made by Asahi Denka Kogyo K.K. (HLB value of 13.5), "Emulgen P I-20T" is nonylphenol ethoxylate made by Kao Corporation (HLB value of 13.2), "Adekatol SO-120" is an ethoxylate of a straight chain alcohol made by Asahi Denka Kogyo K.K. (HLB value of 12.0), "Pluronic L-61" is a polyoxyethylenepolyoxypropylene compound made by Asahi Denka Kogyo K.K. (HLB value of 5.7), and "Detergent 80" is sodium alkylbenzenesulfonate (an anionic surface-active agent) made by Lion Co., Ltd.

The surfaces of two kinds of polypropylene resin bumpers (commercially available two kinds, a type of high rigidity type and a type of high elasticity) were treated according to the process of (a) degreasing→(b) rinsing→(c) surface-conditioning→(d) drying→(e) coating.

(a) Degreasing

Spraying treatment was carried out at 60° C. for 2 minutes with a pressure of 0.8 kg/cm² by using said treating solution (ii).

(b) Rinsing

Rinsing by spraying was carried out at room temperature for 15 seconds by using tap water.

(c) Surface-Conditioning

Using a surface-conditioning solution having a composition shown in Table 5, spraying treatment was carried out at room temperature for 15 seconds.

(d) Drying

Drying was carried out with a hot wind at 55° C. for 10 minutes.

(e) Coating

A chlorinated polypropylene-based primer paint ("RB 150", made by Nippon Bee Chemical Co., Ltd.) was coated with spraying so as to make a film thickness of 8 μm after drying and stood at room temperature for 5 minutes and then, on the film an urethane-based top coat paint ("R-273", made by Nippon Bee Chemical Co., Ltd.) was coated with spraying so as to make a film thickness of 25 μm after drying and stood at 90° C. for 40 minutes, whereby a coated plate of two coat and 1 bake was obtained to offer it for a paint film quality examination. However, the coating was carried out, so as to form a top coat film of thickness 150 μm, for a plate which was used for measuring an interface adhesion strength between a surface of a plastic formings and a primer (a testing method with 80° peeling).

The following quality-tests on a paint film were carried out for the coated plates obtained from the above examples and examples for comparison. Results obtained are shown in Table 6.

PAINT FILM QUALITY-TESTS

① Paint Film Adhesion Strength Test (a 180° Peeling Method)

Testing time point: at 3 days after coating
Testing film width: 1 cm width
Testing surroundings: 20° C. and 75% RH
Testing machine: a tensile testing machine (RTM-100 made by Toyo Boldwine Co.)
Testing conditions: 180° peeling and a stretching velocity of 50 mm/minute Paint film peeling-off strength [kg/cm] was determined by reading an average value in a measuring chart.

② Water-Resisting Secondary Adhesion of Paint Film

A coated plate was immersed at 40° C. for 10 days in a deionized water and then, according to JIS-K-5400 (Japanese Industrial Standard), 25 pieces of checkers were made at 2 mm intervals. A cellophane-made adhesive tape was applied on a surface of the coating plate and then, peeled. Number of the paint film checkers remaining on the coating plate was counted.

The inflammability of the treating solutions (ii) used in said examples and examples for comparison were examined according to a Tagu ignition-testing method in a closed system (JIS K2265-1980) and the results are shown in Table 6.

TABLE 5

| | | | Example 17 | Example 18 | Example 19 | Example 20 | Example 21 | Example 22 |
|---|---|---|---|---|---|---|---|---|
| Composition of treating solution (ii) (g/l) | Alkali builder | Sodium metasilicate | 18 | — | — | 18 | 4 | 18 |
| | | Sodium carbonate | 7 | — | 6 | 7 | 7 | 7 |
| | | Sodium hydrogen carbonate | — | 10 | — | — | — | — |
| | | Sodium orthophosphate | 2 | 2 | 2 | 2 | 10 | 2 |
| | | Sodium hydroxide | — | — | 10 | 2 | — | 2 |
| | | % by weight of sodium metasilicate[*1] | 67 | — | — | 62 | 19 | 62 |
| | Solvent | Kerosene | 8 | 2 | 2 | — | — | — |
| | | SOLVESSO 150 | — | — | — | 8 | 8 | 8 |
| | | Isopropanol | — | — | — | — | — | — |
| | Surface-active agent | Emulgen 910 (HLB value of 12.2) | 2 | — | — | — | — | — |
| | | Newcol 565 FH (HLB value of 12.5) | — | 2 | 2 | — | — | — |
| | | Adekatol SO-135 (HLB value of 13.5) | — | — | — | 2 | 2 | 2 |
| Surface-conditioning solution | Concentration of surface-active agent (%) | Emulgen PI-20T (HLB value of 13.2) | 0.1 | — | — | — | — | — |
| | | Adekatol SO-135 (HLB value of 13.5) | — | 0.5 | 0.5 | 0.5 | 0.5 | — |
| | | Adekatol SO-120 (HLB value of 12.0) | — | — | — | — | — | 0.5 |
| | | Pluronic L-61 (HLB value of 5.7) | — | — | — | — | — | — |
| | Resistivity (Ω · cm) | | 320,000 | 200,000 | 200,000 | 200,000 | 200,000 | 7,800 |

| | | | Example 23 | Example 24 | Example 25 | Example for comparison 5 | Example for comparison 6 | Example for comparison 7 |
|---|---|---|---|---|---|---|---|---|
| Composition of treating solution (ii) (g/l) | Alkali builder | Sodium metasilicate | 18 | — | 18 | 18 | 18 | 18 |
| | | Sodium carbonate | 7 | — | 7 | 7 | 7 | 7 |
| | | Sodium hydrogen carbonate | — | — | — | — | — | — |
| | | Sodium orthophosphate | 2 | — | 2 | 2 | 2 | 2 |
| | | Sodium hydroxide | — | — | — | 2 | — | — |
| | | % by weight of sodium metasilicate[*1] | 67 | — | 67 | 62 | 62 | 62 |
| | Solvent | Kerosene | — | 8 | — | — | — | — |

TABLE 5-continued

|  |  |  |  |  |  |  |  |  |
|---|---|---|---|---|---|---|---|---|
|  |  | SOLVESSO 150 |  | — | — | — | 8 | 8 | 8 |
|  |  | Isopropanol |  | 10 | — | — | — | — | — |
|  | Surface-active agent | Emulgen 910 (HLB value of 12.2) |  | — | — | — | — | — | — |
|  |  | Newcol 565 FH (HLB value of 12.5) |  | — | — | — | — | — | — |
|  |  | Adekatol SO-135 (HLB value of 13.5) |  | 5 | 5 | 5 | 2 | 2 | 2 |
| Surface-conditioning solution | Concentration of surface-active agent (%) | Emulgen PI-20T (HLB value of 13.2) |  | — | — | — | — | Ionic surface-active agent (Detergent 80) | — |
|  |  | Adekatol SO-135 (HLB value of 13.5) |  | 0.5 | 0.5 | 0.5 | — |  | — |
|  |  | Adekatol SO-120 (HLB value of 12.0) |  | — | — | — | — | 0.5 | — |
|  |  | Pluronic L-61 (HLB value of 5.7) |  | — | — | — | 0.5 | — | — |
|  | Resistivity (Ω · cm) |  |  | 200,000 | 200,000 | 200,000 | 8,000 | 8,000 | 8,000 |

(Note)
*[1] Percent by weight against a whole alkali builder

TABLE 6

|  |  |  | Example 17 | Example 18 | Example 19 | Example 20 | Example 21 | Example 22 | Example 23 |
|---|---|---|---|---|---|---|---|---|---|
| Results from paint film quality-tests | Object for coating: Polypropylene bumper of high rigidity | Adhesive strength (kg/cm) | 0.7 | 0.6 | 0.6 | 0.8 | 0.7 | 0.8 | 0.3 |
|  |  | Water-resisting secondary adhesion (checkers, tape) | 100/100 | 100/100 | 100/100 | 100/100 | 100/100 | 95/100 | 95/100 |
|  | Object for coating: Polypropylene bumper of high elasticity | Adhesive strength (kg/cm) | 0.9 | 0.7 | 0.7 | 1.0 | 0.8 | 1.0 | 0.5 |
|  |  | Water-resisting secondary adhesion (checkers, tape) | 100/100 | 100/100 | 100/100 | 100/100 | 100/100 | 98/100 | 100/100 |
| Inflammability of treating solution |  |  | None | None | None | None | None | None | None |

|  |  |  | Example 24 | Example 25 | Example for comparison 5 | Example for comparison 6 | Example for comparison 7 |
|---|---|---|---|---|---|---|---|
| Results from paint film quality-tests | Object for coating: Polypropylene bumper of high rigidity | Adhesive strength (kg/cm) | 0.3 | 0.3 | 0.3–0.6 | 0.3–0.6 | 0.3–0.6 |
|  |  | Water-resisting secondary adhesion (checkers, tape) | 90/100 | 90/100 | 10/100 | 0/100 | 10/100 |
|  | Object for coating: Polypropylene bumper of high elasticity | Adhesive strength (kg/cm) | 0.4 | 0.4 | 0.4–0.8 | 0.4–0.8 | 0.4–0.8 |
|  |  | Water-resisting secondary adhesion (checkers, tape) | 100/100 | 100/100 | 30/100 | 0/100 | 30/100 |
| Inflammability of treating solution |  |  | None | None | None | None | None |

It is seen in Table 6 that the coating plates obtained from the examples are superior in at least the water-resisting secondary adhesion of both the paint film adhesive strength and the water-resisting secondary adhesion, but the coating plates obtained from the examples for comparison are very inferior in the water-resisting secondary adhesion.

The method for painting pretreatment of a plastic formings relating to the present invention, as mentioned above, is carried out by that the plastic formings is brought in contact and treating with a treating solution (i) which is made by suspending a hydrocarbons solvent in water and, therefore, it has a dirt-washing out effect in an extent similar to that of a hitherto-known vapor washing-out method and also, it does not cause environmental destruction and is of almost no danger with respect to ignition.

The cleaner for painting pretreatment of a plastic formings (I) of the present invention, as mentioned above, is composed of combination of;

a hydrocarbons solvent; and, at least one agent selected from a group consisting of a solubilizer, which is for dissolving said solvent into water, and a suspending agent, which is used for suspending said solvent into water;

and therefore, a treating solution (i) can be prepared by adding said hydrocarbons solvent into water followed by suspending. Said treating solution (i) has a dirt-washing out effect against the dirt on a surface of a plastic formings in an extent similar to that of a hitherto-known chlorinated hydrocarbon, and it does not cause waterpollution and has hardness in flashing.

Another method for painting pretreatment of a plastic formings relating to the present invention, as mentioned above, wherein, after a plastic formings is brought, to wash out dirt attaching to a surface of said formings, in contact with a treating solution that contains an alkali component, said treating solution that attaches to the surface of said formings is rinsed out. Then, in at least a final stage of the rinsing, the surface of said formings is brought in contact with a surface-conditioning solution which contains a nonionic surface-active agent having the HLB value of 10 to 17 in a concentration range of 0.001 to 100 g/l. Because of this, the method pays sufficient attention for the sanitary problems in labor and surroundings, is superior in mass production, and gives sufficient paint film adhesion for a plastic formings which shows low paint film adhesion, so that it is replaceable of the TCE-vapor washing method.

If said surface-conditioning solution has a reistivity of 10,000 Ω.cm or more, an adding concentration of the surface-active agent against the surface-conditioning solution can be lowered.

The cleaner for painting pretreatment (II) of the present invention contains ① said specially defined alkali builder in a concentration range of 2 to 200 g/l, ② said specified solvent in a concentration range of 0.3 to 30 g/l, and ③ said specially defined surface-active agent in a concentration range of 0.1 to 10 g/l, and adjusted to have a pH value of at least 8, and therefore, if the painting pretreatment is carried out using this cleaner, even for a polyolefin-based resin formings which is of a low cost and superior in the forming property, but inferior in the paint film adhesion, the WBL can be removed well and, as a result, superior paint film water-resisting secondary adhesion are obtained.

What is claimed is:

1. A method for improving the adhesion of paint to a plastic formed part prior to painting the plastic formed part, comprising contacting the plastic formed part with a treating solution consisting essentially of at least one hydrocarbon solvent suspended in water, the hydrocarbon solvent being included in the treating solution in an amount of from 0.1 to 40 percent by weight, for a period of 10 seconds to 20 minutes; rinsing the treating solution from the plastic formed part; and contacting the rinsed plastic formed part with a surface-conditioning solution comprising 0.001 to 100 g/l of a nonionic surface-active agent having an HLB value of from 10 to 17.

2. A method as defined by claim 1, wherein the hydrocarbon solvent is suspended in water by mechanical means.

3. A method as defined by claim 1, wherein the hydrocarbon solvent is suspended in water by means of a solubilizer.

4. A method as defined by claim 1, wherein the hydrocarbon solvent is suspended in water by means of a suspending agent.

5. A method as defined by claim 1, including the further step of applying an ultrasonic wave to the plastic part while the plastic part is contacted with the treating solution.

6. A method as defined by claim 1, wherein the surface-conditioning solution has a resistivity of at least 10,000 Ω.cm.

7. A method for pretreating a plastic formed part prior to painting the plastic formed part, comprising contacting the plastic formed part with a treating solution consisting essentially of 2 to 200 g/l of an alkali builder, 0.3 to 30 g/l of at least one hydrocarbon solvent, 0.1 to 10 g/l of a surface-active agent, and a balance of water, for a period of 30 seconds to 10 minutes; rinsing the treating solution from the plastic formed part; and contacting the rinsed plastic formed part with a surface-conditioning solution comprising 0.001 to 100 g/l of a nonionic surface-active agent having an HLB value of from 10 to 17.

8. A method as defined by claim 7, wherein the surface-conditioning solution has a resistivity of at least 10,000 Ω.cm.

9. A method as defined by claim 1, wherein the contacting step is conducted at a temperature in the range of 20°–90° C.

10. A method as defined by claim 7, wherein the contacting step is conducted at a temperature in the range of 30°–80° C.

* * * * *